United States Patent
Li et al.

(10) Patent No.: US 9,772,672 B2
(45) Date of Patent: Sep. 26, 2017

(54) APPARATUS, METHOD, AND PROGRAM PRODUCT FOR PROJECTING BATTERY USAGE

(71) Applicant: LENOVO (Singapore) PTE, LTD., New Tech Park (SG)

(72) Inventors: Scott Wentao Li, Cary, NC (US); Zhenglong Bai, Cary, NC (US); Marco Alberto Gonzalez, Durham, NC (US); Robert James Kapinos, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/954,328

(22) Filed: Nov. 30, 2015

(65) Prior Publication Data
US 2017/0153685 A1  Jun. 1, 2017

(51) Int. Cl.
| | |
|---|---|
| G06F 11/30 | (2006.01) |
| G06F 3/048 | (2013.01) |
| G09G 5/00 | (2006.01) |
| G06F 1/32 | (2006.01) |
| G06F 1/30 | (2006.01) |

(52) U.S. Cl.
CPC ............ *G06F 1/3212* (2013.01); *G06F 1/30* (2013.01)

(58) Field of Classification Search
CPC .................................................. G06F 1/30

USPC ........................................................ 713/340
See application file for complete search history.

(56) References Cited

U.S. PATENT DOCUMENTS

| | | | |
|---|---|---|---|
| 6,313,832 B1* | 11/2001 | Ishida ................ | G01R 31/3624 345/211 |
| 8,126,517 B2* | 2/2012 | Ashbrook ......... | H04M 1/72519 455/566 |
| 8,515,499 B1 | 8/2013 | Stekkelpak et al. | |
| 8,958,854 B1 | 2/2015 | Morley et al. | |
| 9,143,178 B1* | 9/2015 | Arscott .................... | H04B 1/38 |
| 9,288,763 B1* | 3/2016 | Zhao ................. | H04W 52/0261 |
| 2008/0201587 A1 | 8/2008 | Lee | |
| 2011/0071780 A1 | 3/2011 | Tarkoma | |
| 2012/0015695 A1* | 1/2012 | Hackborn ........... | G06F 11/3409 455/566 |
| 2012/0317432 A1 | 12/2012 | Assad et al. | |
| 2013/0103960 A1 | 4/2013 | Alberth et al. | |
| 2015/0084778 A1 | 3/2015 | Mittal et al. | |
| 2015/0346933 A1* | 12/2015 | Vyas .................. | G01R 31/3682 715/772 |

* cited by examiner

*Primary Examiner* — Suresh Suryawanshi
(74) *Attorney, Agent, or Firm* — Kunzler Law Group

(57) ABSTRACT

Apparatuses, methods, and program products are disclosed for projecting battery usage. By use of a processor, an expected battery usage rate of an application is determined. An estimated length of time a battery will power an apparatus if the application is executed is determined. The estimated length of time the battery will power the apparatus may be based on the expected battery usage rate of the application and a current remaining battery power. The estimated length of time together with a visual representation of the application is displayed.

11 Claims, 7 Drawing Sheets

APPARATUS, METHOD, AND PROGRAM PRODUCT FOR PROJECTING BATTERY USAGE

FIELD

The subject matter disclosed herein relates to batteries and more particularly relates to projecting battery usage.

BACKGROUND

Description of the Related Art

Information handling devices, such as desktop computers, laptop computers, tablet computers, smart phones, optical head-mounted display units, smart watches, etc., are ubiquitous in society. These information handling devices may use a battery. The time the battery will power an information handling device may depend on how the information handling device is used.

BRIEF SUMMARY

An apparatus for projecting battery usage is disclosed. A method and computer program product also perform the functions of the apparatus. In one embodiment, the apparatus includes a display device, a processor, and a memory that stores code executable by the processor. The code, in various embodiments, is executable by the processor to determine an expected battery usage rate of an application. In a further embodiment, the code is executable by the processor to determine an estimated length of time a battery will power the apparatus if the application is executed. The estimated length of time the battery will power the apparatus may be based on the expected battery usage rate of the application and a current remaining battery power. The code, in some embodiments, is executable by the processor to display the estimated length of time on the display device together with a visual representation of the application.

In a further embodiment, the code executable by the processor to determine the expected battery usage rate of the application further includes code executable by the processor to analyze historical battery usage data of the application. In some embodiments, the code executable by the processor to analyze the historical battery usage data of the application further includes code executable by the processor to access the memory. The memory may include the historical battery usage data.

In another embodiment, the memory further includes code executable by the processor to determine a respective expected battery usage rate for each application of multiple applications. In such an embodiment, the memory further includes code executable by the processor to determine a respective estimated length of time the battery will power the apparatus for each application of the multiple applications if the respective application is executed. In some embodiments, the memory further includes code executable by the processor to display each respective estimated length of time together with a respective visual representation of a respective application of the multiple applications. In certain embodiments, the code executable by the processor to determine the estimated length of time the battery will power the apparatus if the application is executed further includes code executable by the processor to add the expected battery usage rate of the application to a current battery usage rate to result in a combined battery usage rate, and divide the current remaining battery power by the combined battery usage rate.

In one embodiment, the code executable by the processor to determine the estimated length of time the battery will power the apparatus if the application is executed further includes code executable by the processor to determine a combined estimated length of time the battery will power the apparatus for multiple applications that are selected to be executed together and display the combined estimated length of time together with a respective visual representation of each application of the multiple applications that are selected to be executed together.

A method for projecting battery usage, in one embodiment, includes determining, by use of a processor, an expected battery usage rate of an application. In some embodiments, the method includes determining an estimated length of time a battery will power an apparatus if the application is executed. The estimated length of time the battery will power the apparatus may be based on the expected battery usage rate of the application and a current remaining battery power. In a further embodiment, the method includes displaying the estimated length of time together with a visual representation of the application.

In some embodiments, determining the expected battery usage rate of the application includes analyzing historical battery usage data of the application. In such embodiments, analyzing the historical battery usage data of the application may include accessing a memory of the apparatus that includes the historical battery usage data. In some embodiments, analyzing the historical battery usage data of the application includes accessing a remote storage device that includes the historical battery usage data. In some embodiments, determining the expected battery usage rate of the application includes determining the expected battery usage rate of the application with the application not being executed.

In some embodiments, the method includes determining a respective expected battery usage rate for each application of multiple applications. In such embodiments, the method may include determining a respective estimated length of time the battery will power the apparatus for each application of the multiple applications if the respective application is executed. In certain embodiments, the method includes displaying each respective estimated length of time together with a respective visual representation of a respective application of the plurality of applications.

In certain embodiments, determining the estimated length of time the battery will power the apparatus if the application is executed includes adding the expected battery usage rate of the application to a current battery usage rate to result in a combined battery usage rate, and dividing the current remaining battery power by the combined battery usage rate.

In one embodiment, a program product includes a computer readable storage medium that stores code executable by a processor. The executable code, in certain embodiments, includes code to perform determining an expected battery usage rate of an application. In a further embodiment, the executable code includes code to perform determining an estimated length of time a battery will power an apparatus if the application is executed. The estimated length of time the battery will power the apparatus may be based on the expected battery usage rate of the application and a current remaining battery power. The executable code, in some embodiments, includes code to perform displaying the estimated length of time together with a visual representation of the application.

In certain embodiments, the code further includes code to perform determining a respective expected battery usage rate for each application of multiple applications. In some embodiments, the code further includes code to perform determining a respective estimated length of time the battery will power the apparatus for each application of the multiple applications if the respective application is executed. In further embodiments, the code further includes code to perform displaying each respective estimated length of time together with a respective visual representation of a respective application of the multiple applications.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
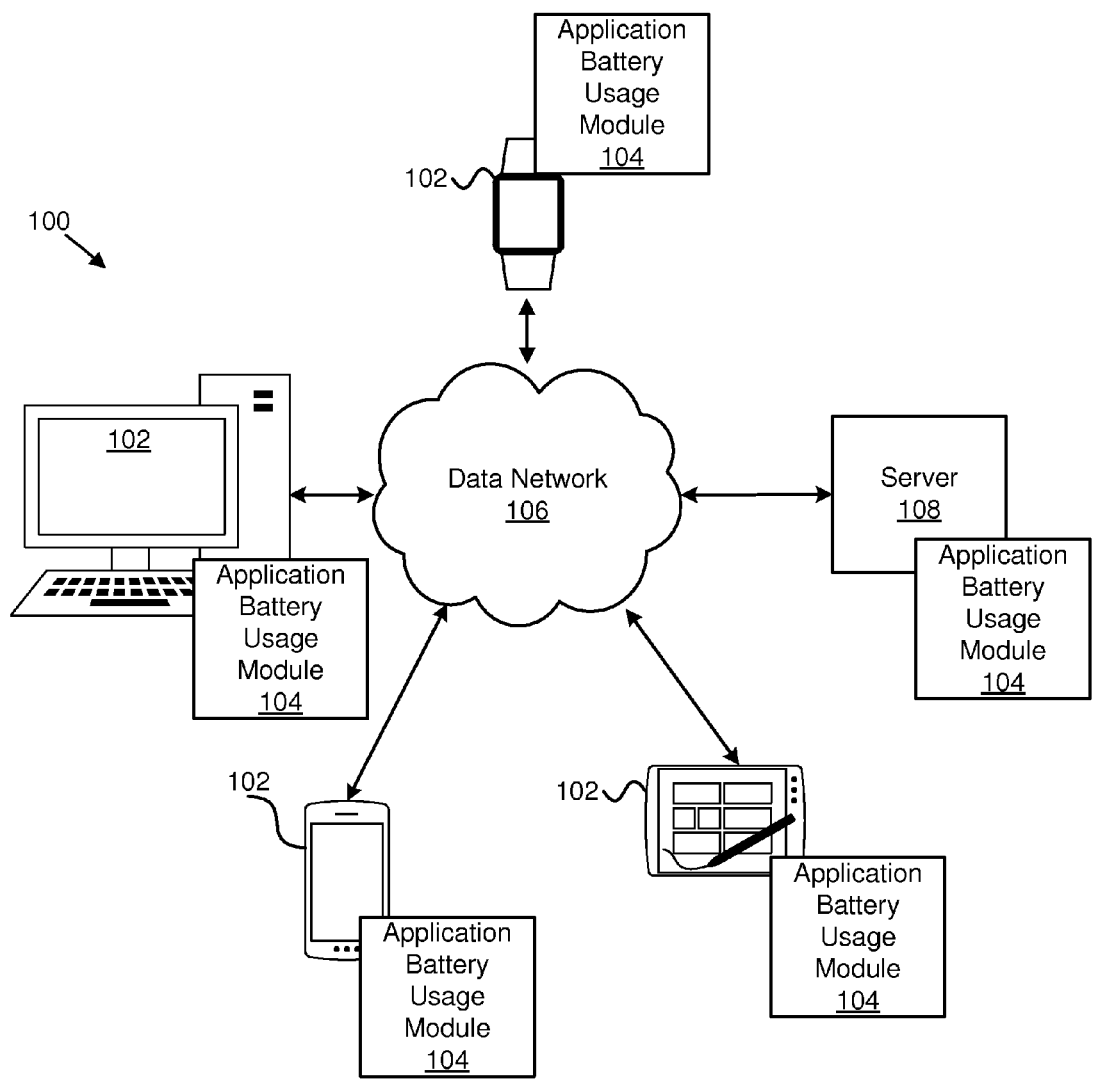
FIG. 1 is a schematic block diagram illustrating one embodiment of a system for projecting battery usage.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for projecting battery usage. In one embodiment, the system 100 includes information handling devices 102, application battery usage modules 104, data networks 106, and servers 108. Even though a specific number of information handling devices 102, application battery usage modules 104, data networks 106, and servers 108 are depicted in FIG. 1, one of skill in the art will recognize that any number of information handling devices 102, application battery usage modules 104, data networks 106, and servers 108 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the information handling devices 102 include wearable devices, such as smart watches, fitness bands, optical head-mounted displays, or the like. The information handling devices 102 may access the data network 106 directly using a network connection.

The information handling devices 102 and/or the servers 108 may include an embodiment of the application battery usage module 104. In certain embodiments, the application battery usage module 104 may determine an expected battery usage rate of an application. The application battery usage module 104 may determine an estimated length of time a battery will power an apparatus (e.g., an information handling device 102) if the application is executed. The estimated length of time the battery will power the apparatus may be based on the expected battery usage rate of the application and a current remaining battery power. The application battery usage module 104 may also display the estimated length of time on a display device together with a visual representation of the application. In this manner, the application battery usage module 104 may be used to show how long an application may operate when executed based on the current battery power available.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

In one embodiment, the servers 108 include computing devices, such as desktop computers, laptop computers, mainframe computers, cloud servers, virtual servers, and/or the like. In some embodiments, the servers 108 are designed as application servers, email servers, database servers, file servers, game servers, home servers, media servers, web servers, and/or the like. In certain embodiments, the servers 108 store data, and may be designed to be accessed by one or more information handling devices 102 through the network 106. In certain embodiments, the servers 108 may include at least a portion of the application battery usage module 104 and may perform one or more operations of the application battery usage module 104.

Figure 2:
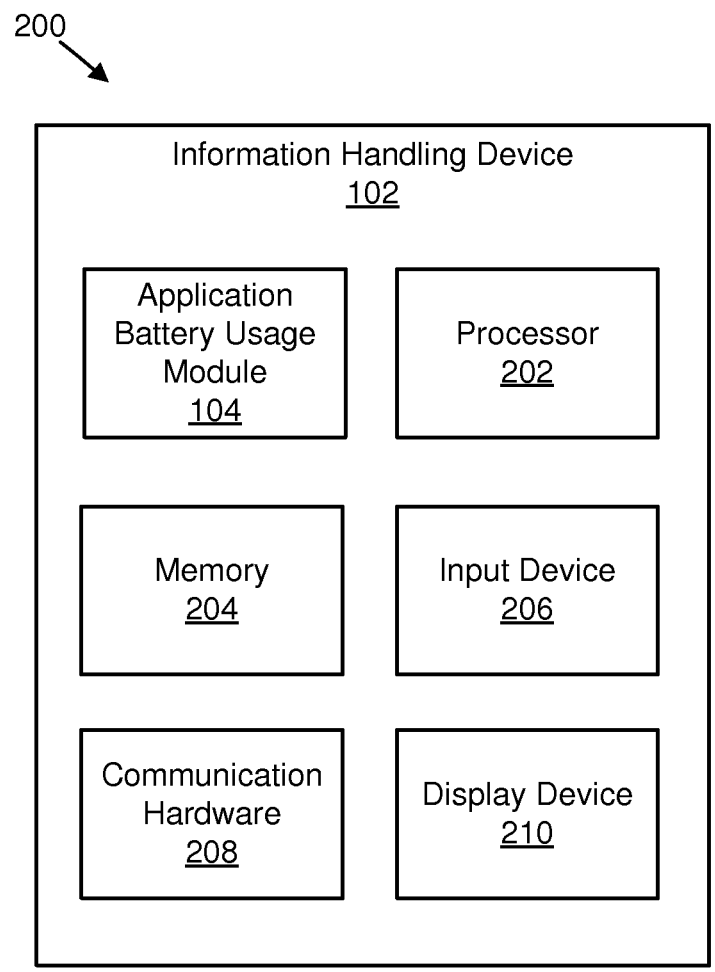
FIG. 2 is a schematic block diagram illustrating one embodiment of an apparatus including an information handling device.

FIG. 2 depicts one embodiment of an apparatus 200 that may be used for projecting battery usage. The apparatus 200 includes one embodiment of the information handling device 102. Furthermore, the information handling device 102 may include the application battery usage module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the application battery usage module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to battery usage history of applications. In some embodiments, the memory 204 also stores program code and related data, such as an operating system or other controller algorithms operating on the information handling device 102.

The information handling device 102 may use the application battery usage module 104 for determining battery usage of applications. As may be appreciated, the application battery usage module 104 may include computer hardware, computer software, or a combination of both computer hardware and computer software. For example, the application battery usage module 104 may include circuitry, or a processor, used to determine an expected battery usage rate of an application. In certain embodiments, the expected battery usage rate of the application may be determined with the application not being executed. As another example, the application battery usage module 104 may include computer program code that determines an estimated length of time a battery will power the information handling device 102 if the application is executed.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, or the like.

In certain embodiments, the display device 210 includes one or more speakers for producing sound. For example, the display device 210 may produce an audible alert or notification (e.g., a beep or chime) upon determining an expected battery usage rate of an application. In some embodiments, the display device 210 includes one or more haptic devices for producing vibrations, motion, or other haptic feedback. For example, the display device 210 may produce haptic feedback upon initiating data limitation.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the application battery usage module 104.

Figure 3:
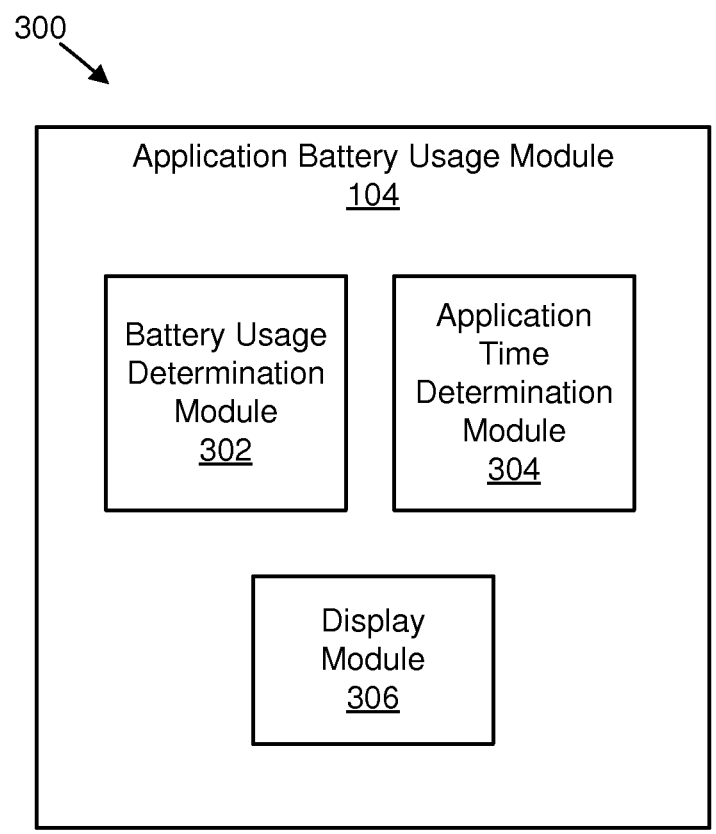
FIG. 3 is a schematic block diagram illustrating one embodiment of an apparatus including an application battery usage module.

FIG. 3 depicts a schematic block diagram illustrating one embodiment of an apparatus 300 that includes one embodiment of the application battery usage module 104. Furthermore, the application battery usage module 104 includes a battery usage determination module 302, an application time determination module 304, and a display module 306.

The battery usage determination module 302 may be used to determine an expected battery usage rate of an application not being executed. In some embodiments, the battery usage determination module 302 may be used to determine an expected battery usage rate of an application that is being executed. In certain embodiments, the battery usage determination module 302 may be used to determine an expected battery usage rate of more than one application. The more than one application may have a status of being executed, not being executed, or a combination thereof.

In one embodiment, the battery usage determination module 302 may determine the expected battery usage rate of an application by analyzing historical battery usage data of the application. The historical battery usage data of the application may include information such as a name of an application, a length of time that the application has been used, an amount of battery power used by the application, an amount of processor used by the application, an amount of network data sent and/or received by the application, and so forth. Such historical battery usage data may correspond to one execution of the application, a combination of executions of the application for the life of one battery, a lifetime use of the application on an apparatus, aggregated data corresponding to the application use on multiple apparatuses, and so forth.

The historical battery usage data may be stored on the memory 204 of an information handling device 102 that includes the application battery usage module 104 and/or the historical battery usage data may be stored on a remote storage device (e.g., remote memory), such as on an information handling device 102 that does not include the application battery usage module 104.

In certain embodiments, the expected battery usage rate may be expressed as a percent of an apparatus's battery power that is used per second, minute, hour, or so forth. In some embodiments, the expected battery usage rate may be expressed as an amount of battery power consumed per second, minute, hour, or so forth.

In some embodiments, the application time determination module 304 may be used to determine an estimated length of time a battery will power an apparatus if the application is executed. The estimated length of time the battery will power the apparatus may be based on the expected battery usage rate of the application and a current remaining battery power. Accordingly, the application time determination module 304 may determine the current remaining battery power. As may be appreciated, determining the current remaining battery power of a battery may be performed using any suitable technique. For example, an information handling device 102 that contains a battery may measure an amount of power used by the information handling device 102 after fully charging the battery and subtracting the amount of power used by the information handling device 102 from a total power capacity of the battery to determine the current remaining battery power of the battery.

In one embodiment, the estimated length of time the battery will power the information handling device 102 may be calculated by adding the expected battery usage rate of an application to a current battery usage rate to result in a combined battery usage rate, then by dividing the current remaining battery power by the combined battery usage rate. For example, if an expected battery usage rate is 5% of the battery capacity per hour and a current battery usage rate is 8% of the battery capacity per hour, the combined battery usage rate would be 13% of the battery capacity per hour. Then, if the current remaining battery power is 52%, the estimated length of time the battery will power the information handling device 102 if the application is run would be 4 hours (e.g., 52% remaining power/13% power use per hour=4 hours). As may be appreciated, the current battery usage rate may be determined by measuring an amount of power used over time, or by any other suitable method. In certain embodiments, an estimated length of time the battery will power the information handling device 102 may be determined for multiple applications.

In one embodiment, the display module 306 may display the estimated length of time together with a representation of the application. In some embodiments, the display module 306 may display an estimated length of time for multiple applications with a representation of a respective application. The display module 306 may use the display device 210 to display the estimated length of time for an application with its representation. The representation of the application may be any suitable representation, such as an icon, an image, a name, and so forth.

By displaying the estimated length of time that an application will run (e.g., based on the battery capacity used by the application), a user may determine whether they have enough battery capacity to use a desired application. For example, a user needing to make a long phone call may be able to determine whether they have battery capacity to make such a call. As another example, a user wanting to play a gaming application may determine whether they have enough battery capacity to play the desired gaming application. As a further example, a user wanting to use a map software or navigation software may determine whether they have enough battery capacity to navigate between one or more locations.

In certain embodiments, a user may be able to indicate which applications the user desires to use and for how long. The application battery usage module 104 may combine all information entered by the user and determine whether the user has enough battery power to operate all of their desired applications for their desired lengths of time. Furthermore, the application battery usage module 104 indicate how long additional applications will run based on the user inputs for planned application use.

Figure 4:
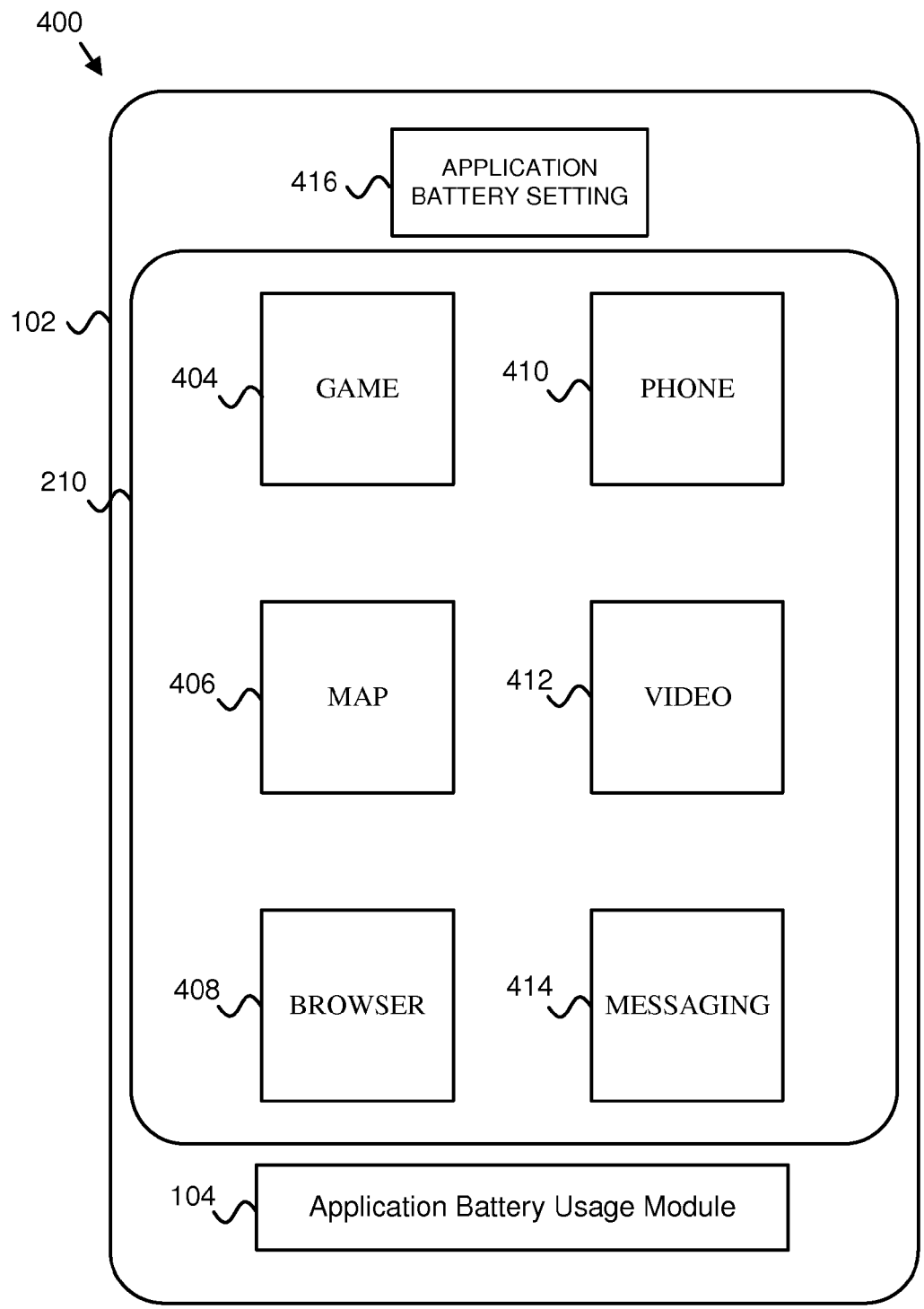
FIG. 4 is a schematic block diagram illustrating another embodiment of an apparatus including an application battery usage module.

FIG. 4 is a schematic block diagram illustrating another embodiment of an apparatus 400 that includes one embodiment of the application battery usage module 104. As illustrated, the apparatus 400 includes one embodiment of the information handling device 102. Moreover, the information handling device 102 includes an embodiment of the display device 210 for displaying various items.

The display device 210 may display any suitable items. In the illustrated embodiment, the display device 210 displays a representation of a game application 404, a representation of a map application 406, a representation of a browser application 408, a representation of a phone application 410, a representation of a video application 412, and a representation of a messaging application 414. Each representation of an application may include one or more of a name of the application, an icon corresponding to the application, a picture corresponding to the application, and any other representation of the application. In certain embodiments, selection of the representation of the application may execute the application.

Figure 5:
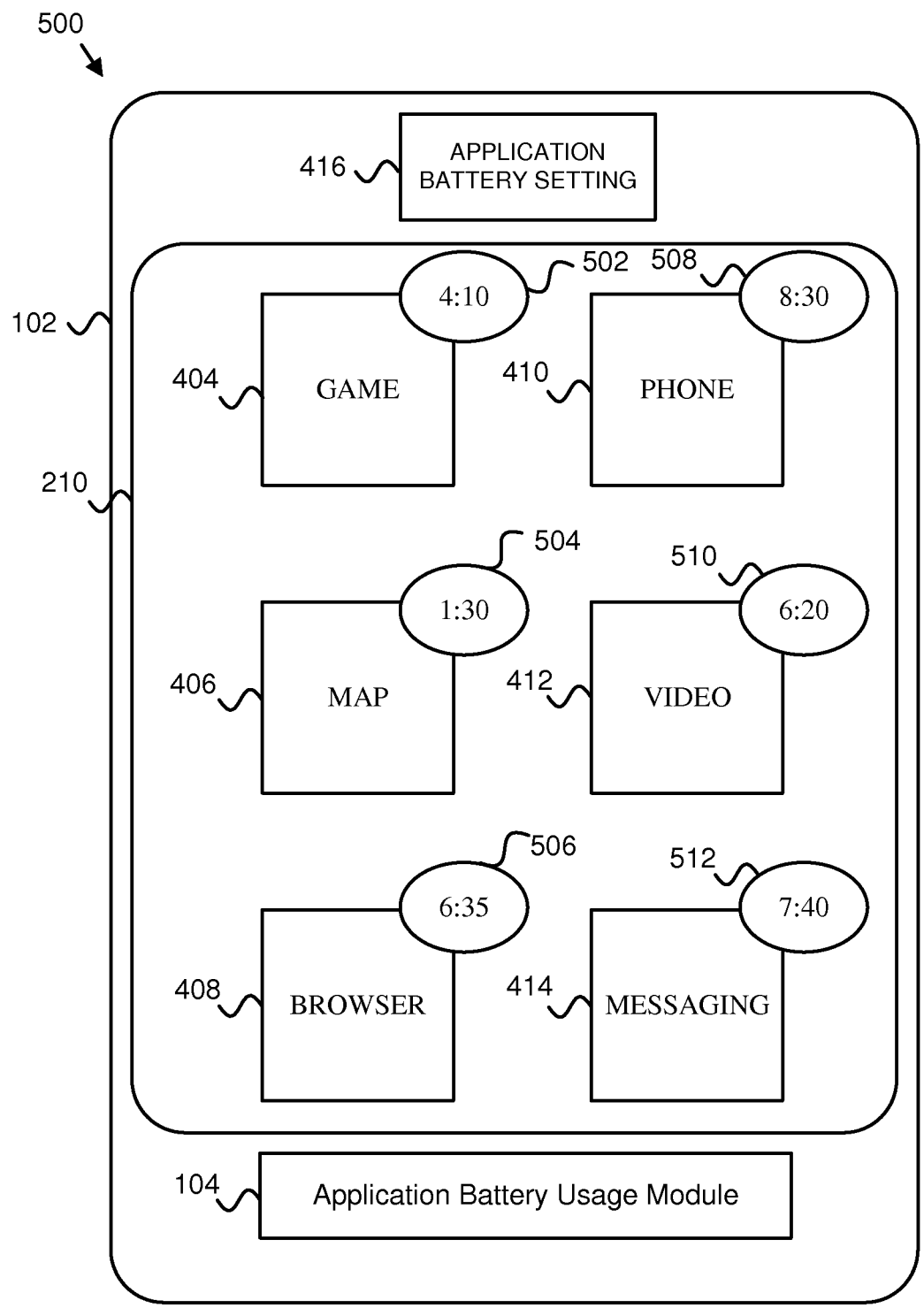
FIG. 5 is a schematic block diagram illustrating a further embodiment of an apparatus including an application battery usage module.

The information handling device 102 of apparatus 400 includes an application battery setting 416 that may be used to display an estimated length of time that each application corresponding to the representations of applications 404, 406, 408, 410, 412, and 414 will have sufficient battery power to operate if executed, as explained in greater detail in FIG. 5. In one embodiment, the application battery setting 416 may include an option selectable by a user that upon selection displays the estimated length of time that each application will have sufficient battery power to operate if executed.

FIG. 5 is a schematic block diagram illustrating another embodiment of an apparatus 500 that includes one embodiment of the application battery usage module 104. In the illustrated embodiment, the application battery setting 416 is set to display the estimated length of time that each application will have sufficient battery power to operate if executed.

Specifically, as illustrated, a first estimated time 502 is displayed and indicates that the battery of the information handling device 102 may operate any currently running programs in addition to the game application (e.g., that is not currently being executed) for 4 hours and 10 minutes. Furthermore, a second estimated time 504 is displayed and indicates that the battery of the information handling device 102 may operate any currently running programs in addition to the map application (e.g., that is not currently being executed) for 1 hour and 30 minutes. Moreover, a third estimated time 506 is displayed and indicates that the battery of the information handling device 102 may operate any currently running programs in addition to the browser application (e.g., that is not currently being executed) for 6 hours and 35 minutes.

In addition, a fourth estimated time 508 is displayed and indicates that the battery of the information handling device 102 may operate any currently running programs in addition to the phone application (e.g., that is not currently being executed) for 8 hours and 30 minutes. Furthermore, a fifth estimated time 510 is displayed and indicates that the battery of the information handling device 102 may operate any currently running programs in addition to the video application (e.g., that is not currently being executed) for 6 hours and 20 minutes. Moreover, a sixth estimated time 512 is displayed and indicates that the battery of the information handling device 102 may operate any currently running programs in addition to the messaging application (e.g., that is not currently being executed) for 7 hours and 40 minutes.

In certain embodiments, a user may select how long an application is desired to be used, such as via the application battery settings 416, or via selecting one of the estimated times. After a user selects how long an application is desired to be used, other time estimations may be updated to indicate an estimate of how long they will operate if executed in addition to any user defined operating times. For example, a user may indicate that they plan on using the map application for 1 hour. Accordingly, in such an example, the fourth estimated time 508 corresponding to the phone application may be updated to indicate a time of 2 hours (e.g., that may or may not overlap with operation of the map application) of operation taking into account use of the map application for 1 hour.

Figure 6:
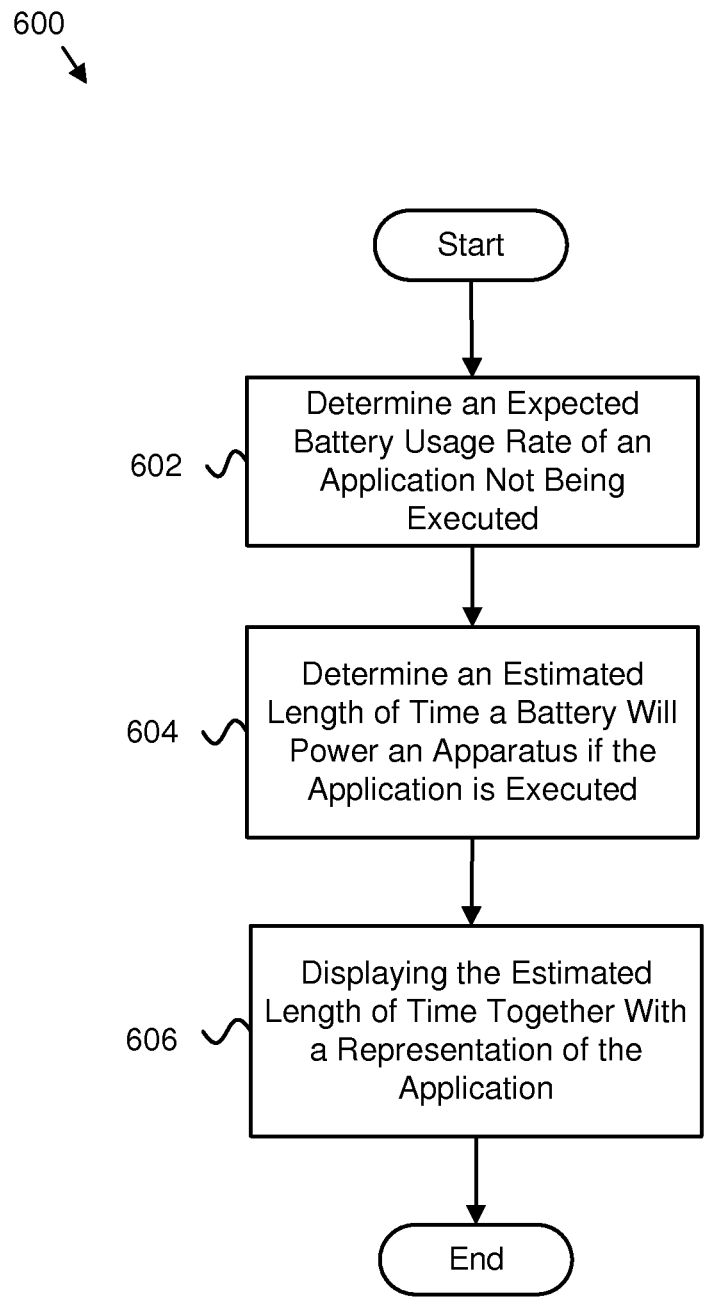
FIG. 6 is a schematic flow chart diagram illustrating an embodiment of a method for projecting battery usage.

FIG. 6 is a schematic flow chart diagram illustrating an embodiment of a method 600 for projecting battery usage. In some embodiments, the method 600 is performed by an apparatus, such as the information handling device 102. In other embodiments, the method 600 may be performed by a module, such as the application battery usage module 104. In certain embodiments, the method 600 may be performed by a processor executing program code, for example, a microcontroller, a microprocessor, a CPU, a GPU, an auxiliary processing unit, a FPGA, or the like.

The method 600 may include determining 602 an expected battery usage rate of an application. In certain embodiments, the battery usage determination module 302 may determine 602 the expected battery usage rate of an application. In some embodiments, determining 602 the expected battery usage rate of the application includes analyzing historical battery usage data of the application. In various embodiments, analyzing the historical battery usage data of the application includes accessing a memory of the apparatus that includes the historical battery usage data. In certain embodiments, analyzing the historical battery usage data of the application includes accessing a remote storage device that includes the historical battery usage data. Moreover, in some embodiments, an expected battery usage rate of multiple applications may be determined. In some embodiments, determining 602 the expected battery usage rate of the application includes determining the expected battery usage rate of the application with the application not being executed.

The method 600 may also include determining 604 an estimated length of time a battery will power an apparatus if the application is executed. The estimated length of time the battery will power the apparatus may be based on the expected battery usage rate of the application and a current remaining battery power. In certain embodiments, the application time determination module 304 may determine 604 the estimated length of time the battery will power the apparatus if the application is executed. In one embodiment, determining 604 the estimated length of time the battery will power the apparatus if the application is executed includes adding the expected battery usage rate of the application to a current battery usage rate to result in a combined battery usage rate, and dividing the current remaining battery power by the combined battery usage rate. In various embodiments, an estimated length of time may be determined for multiple different applications.

The method 600 may display 606 the estimated length of time together with a representation of the application, and the method 600 may end. In one embodiment, the display module 306 may display 606 the estimated length of time together with the representation of the application. In some embodiments, multiple estimated lengths of time may be displayed together with corresponding representations of the applications.

Figure 7:
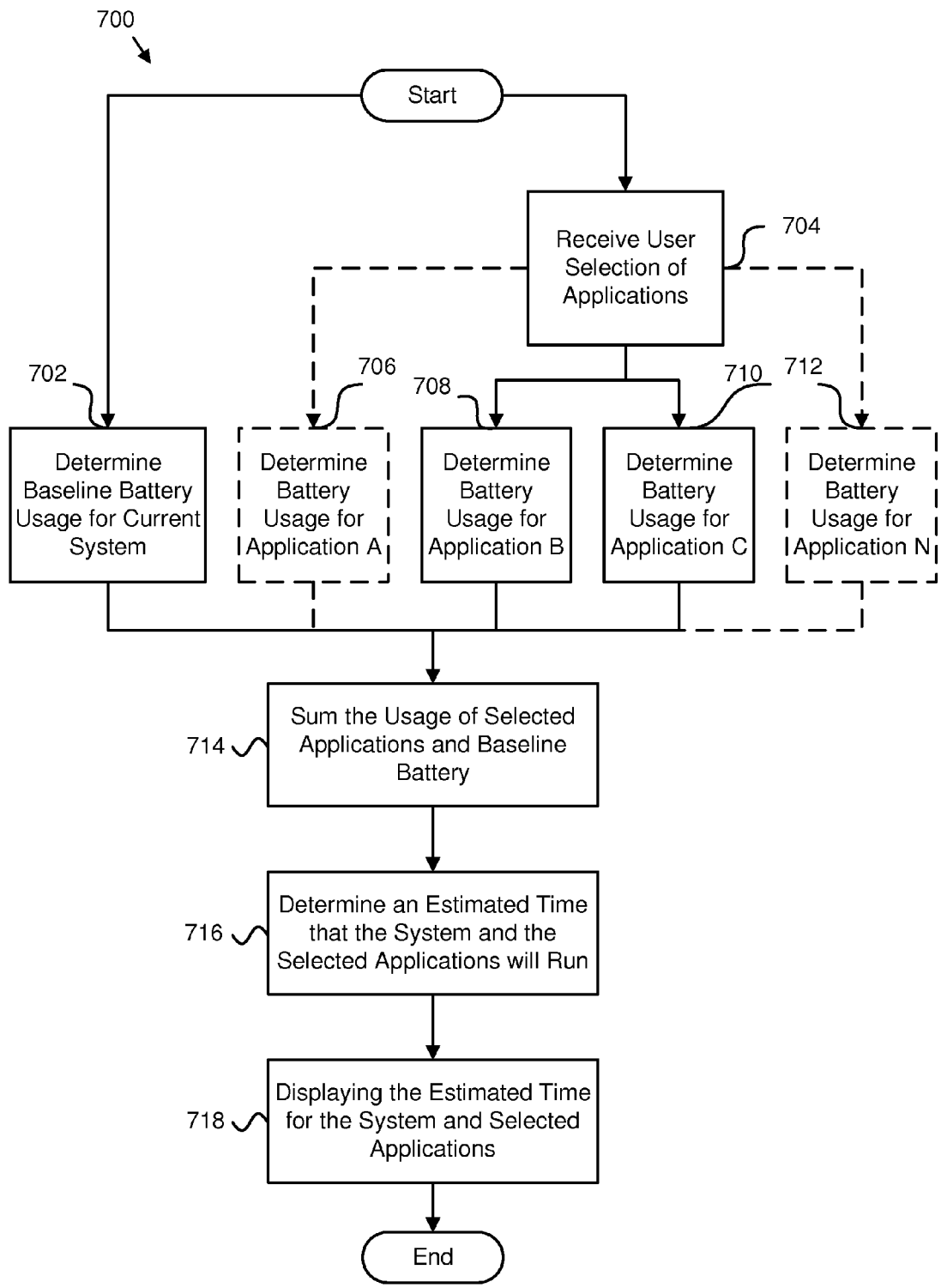
FIG. 7 is a schematic flow chart diagram illustrating an embodiment of another method for projecting battery usage.

FIG. 7 is a schematic flow chart diagram illustrating an embodiment of another method 700 for projecting battery usage. In some embodiments, the method 700 is performed by an apparatus, such as the information handling device 102. In other embodiments, the method 700 may be performed by a module, such as the application battery usage module 104. In certain embodiments, the method 700 may be performed by a processor executing program code, for example, a microcontroller, a microprocessor, a CPU, a GPU, an auxiliary processing unit, a FPGA, or the like.

As illustrated, the method 700 determines 702 a baseline battery usage for a current system. For example, the method 700 may determine 702 a battery usage rate for applications currently running on the system (e.g., on an information handling device 102). The battery usage rate may be an amount of battery life used out of a remaining battery life over a period of time. For example, the battery usage rate may be a percent of the remaining battery life used per second, minute, hour, etc. In one example, a battery usage rate may be 0.1% of the remaining battery life used per minute. In another example, the battery usage rate may be an amount of power used out of a remaining battery power over a period of time. The period of time may be any suitable period of time, such as a second, minute, hour, etc.

The method 700 receives 704 a user selection of applications that the user would like to execute concurrently. For example, the user may select any number of applications that the user would like to run concurrently (e.g., game, phone, map, video, browser, messaging, etc.). As illustrated, the method 700 may determine 706 a battery usage rate for application A, determine 708 a battery usage rate for application B, determine 710 a battery usage rate for application C, and/or determine 712 a battery usage rate for any number of applications up to an N number of applications. The battery usage rates that are determined depend on the applications that are selected by the user.

In the illustrated embodiment, the user has selected applications B and C. In one example, application B may have a battery usage rate of 0.05% of the remaining battery life used per minute, and application C may have a battery usage rate of 0.08% of the remaining battery life used per minute.

The method 700, sums 714 the usage rates of the selected applications B and C and the baseline battery. In one example, the sum 714 of the usage rates may be 0.1% (e.g., baseline battery usage rate) plus 0.05% (e.g., application B battery usage rate) plus 0.08% (e.g., application C battery usage rate) to equal 0.23% (e.g., expected battery usage rate if applications B and C are both executed in addition to currently running applications).

The method 700 then determines 716 an estimated time that the system and the applications B and C will run based on the remaining battery life. In one embodiment, the estimated time may be determined by dividing a remaining battery life by the sum of the usage rates of the selected applications and the baseline battery. In one example, the remaining battery life may be 50% and the sum of the usage rates of the selected applications and the baseline battery may be 0.23%, therefore, the estimated time may be approximately 217 minutes or 3 hours and 37 minutes (e.g., 50%/0.23%).

Moreover, the method 700 may display 718 the estimated time for the system together with the selected applications, then the method 700 may end. For example, the method 700 may display 718 with applications B and C that they have 3 hours and 37 minutes time remaining if executed together with all other currently running applications on the system.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a display device;
   a processor;
   a memory that stores code executable by the processor to:
   determine an expected battery usage rate of each application of a plurality of applications;
   receive a usage length of time that a selected application of the plurality of applications will be used;
   determine an estimated length of time a battery will power the apparatus for each application of the plurality of applications if the selected application is executed for the usage length of time, wherein the estimated length of time the battery will power the apparatus is based on the expected battery usage rate of the respective application and a current remaining battery power; and
   display the estimated length of time for each application of the plurality of applications on the display device together with a visual representation of the respective application in response to a selection to display the estimated length of time for each application of the plurality of applications.

2. The apparatus of claim 1, wherein the code executable by the processor to determine the expected battery usage rate of each application of the plurality of application further comprises code executable by the processor to analyze historical battery usage data of each application of the plurality of applications.

3. The apparatus of claim 2, wherein the code executable by the processor to analyze the historical battery usage data of each application of the plurality of applications further comprises code executable by the processor to access the memory, wherein the memory comprises the historical battery usage data.

4. The apparatus of claim 1, wherein the code executable by the processor to determine the estimated length of time the battery will power the apparatus for each application of the plurality of applications if the selected application is executed for the usage length of time further comprises code executable by the processor to add the expected battery usage rate of the respective application to a current battery usage rate to result in a combined battery usage rate, and divide the current remaining battery power by the combined battery usage rate.

5. The apparatus of claim 1, wherein the code executable by the processor to determine the estimated length of time the battery will power the apparatus for each application of the plurality of applications if the selected application is executed for the usage length of time further comprises code executable by the processor to determine a combined estimated length of time the battery will power the apparatus for a plurality of applications that are selected to be executed together and display the combined estimated length of time together with a respective visual representation of each application of the plurality of applications that are selected to be executed together.

6. A method comprising:
   determining, by use of a processor, an expected battery usage rate of each application of a plurality of applications;
   receiving a usage length of time that a selected application of the plurality of applications will be used;
   determining an estimated length of time a battery will power an apparatus for each application of the plurality of applications if the selected application is executed for the usage length of time, wherein the estimated length of time the battery will power the apparatus is based on the expected battery usage rate of the respective application and a current remaining battery power; and
   displaying the estimated length of time for each application of the plurality of applications together with a visual representation of the respective application in response to a selection to display the estimated length of time for each application of the plurality of applications.

7. The method of claim 6, wherein determining the expected battery usage rate of each application of the plurality of applications comprises analyzing historical battery usage data of each application of the plurality of applications.

8. The method of claim 7, wherein analyzing the historical battery usage data of each application of the plurality of applications comprises at least one of accessing a memory of the apparatus that includes the historical battery usage data and accessing a remote storage device that includes the historical battery usage data.

9. The method of claim 6, wherein determining the expected battery usage rate of each application of the plurality of applications comprises determining the expected battery usage rate of the respective application with the respective application not being executed.

10. The method of claim 6, wherein determining the estimated length of time the battery will power the apparatus for each application of the plurality of applications if the selected application is executed for the usage length of time comprises adding the expected battery usage rate of the respective application to a current battery usage rate to result in a combined battery usage rate, and dividing the current remaining battery power by the combined battery usage rate.

11. A program product comprising a computer readable storage medium that stores code executable by a processor, the executable code comprising code to perform:

determining an expected battery usage rate of each application of a plurality of applications;

receiving a usage length of time that a selected application of the plurality of applications will be used;

determining an estimated length of time a battery will power an apparatus for each application of the plurality of applications if the selected application is executed for the usage length of time, wherein the estimated length of time the battery will power the apparatus is based on the expected battery usage rate of the respective application and a current remaining battery power; and displaying the estimated length of time for each application of the plurality of applications together with a visual representation of the respective application in response to a selection to display the estimated length of time for each application of the plurality of applications.

* * * * *